US009624397B2

(12) United States Patent
Bayer et al.

(10) Patent No.: US 9,624,397 B2
(45) Date of Patent: Apr. 18, 2017

(54) METHODS FOR THE PRODUCTION OF POLY(CYANOACRYLATE) FIBERS

(71) Applicant: FONDAZIONE ISTITUTO ITALIANO DI TECNOLOGIA, Genoa (IT)

(72) Inventors: Ilker S. Bayer, Genoa (IT); Elisa Mele, Castrignano Dei Greci (IT); Roberto Cingolani, Ceranesi (IT); Athanasia Athanasiou, Ceranesi (IT)

(73) Assignee: FONDAZIONE ISTITUTO ITALIANO DI TECNOLOGIA, Genoa (IT)

( * ) Notice: Subject to any disclaimer, the term of this patent is extended or adjusted under 35 U.S.C. 154(b) by 0 days.

(21) Appl. No.: 14/890,913

(22) PCT Filed: May 15, 2014

(86) PCT No.: PCT/IB2014/061457
§ 371 (c)(1),
(2) Date: Nov. 13, 2015

(87) PCT Pub. No.: WO2014/184761
PCT Pub. Date: Nov. 20, 2014

(65) Prior Publication Data
US 2016/0115339 A1 Apr. 28, 2016

(30) Foreign Application Priority Data
May 16, 2013 (IT) .............................. TO2013A0396

(51) Int. Cl.
*C09D 133/14* (2006.01)
*C08F 222/32* (2006.01)
(Continued)

(52) U.S. Cl.
CPC ........... *C09D 133/14* (2013.01); *B05D 3/002* (2013.01); *C08F 222/32* (2013.01); *D01D 5/003* (2013.01);
(Continued)

(58) Field of Classification Search
CPC ..... C08F 222/32; C09D 133/14; D01D 5/003; D01D 5/0084; D01F 6/16; D01F 6/18
See application file for complete search history.

(56) References Cited

U.S. PATENT DOCUMENTS

2006/0148978 A1* 7/2006 Reneker ................... C08F 2/00
524/556
2008/0296808 A1 12/2008 Joo
2013/0226236 A1* 8/2013 Kim ..................... C07C 253/30
606/231

FOREIGN PATENT DOCUMENTS

WO 2005079339 A2 9/2005

OTHER PUBLICATIONS

Mankidy, Pratik, Ph.D Abstract, The Penn State Univ., 2007.*
(Continued)

*Primary Examiner* — Satya Sastri
(74) *Attorney, Agent, or Firm* — Robert E. Alderson, Jr.

(57) ABSTRACT

Methods are provided for the production of poly(cyanoacrylate) micro- or nanofibers which include mixing the cyanoacrylate monomer with a dipolar aprotic solvent to form a poly(cyanoacrylate) gel, dissolving the gel in a solvent for acrylates to form a solution suitable for electrospinning, and submitting the solution thus obtained to electrospinning to form said micro- or nanofibers. The micro- or nanofibers thus obtained can be used to form coatings that adhere to a substrate as a result of thermal treatment.

6 Claims, 1 Drawing Sheet

(51) Int. Cl.
*D01D 5/00* (2006.01)
*D01F 6/16* (2006.01)
*D01F 6/18* (2006.01)
*B05D 3/00* (2006.01)

(52) U.S. Cl.
CPC ............. *D01D 5/0084* (2013.01); *D01F 6/16* (2013.01); *D01F 6/18* (2013.01)

(56) References Cited

OTHER PUBLICATIONS

Bhargava, Submicron Structures, Electrospinning and Filters, 2007.*
Database WPI, Thomson Scientific, London, Week 201234, AN 2012-F43059, XP002718317.

* cited by examiner

METHODS FOR THE PRODUCTION OF POLY(CYANOACRYLATE) FIBERS

CROSS-REFERENCE TO RELATED APPLICATIONS

This application is a National Phase Application of PCT International Application No. PCT/IB2014/061457, International Filing Date, May 15, 2014, claiming priority to Italian Patent Application No. TO2013A000396 (102013902156593), filed May 16, 2013, each of which is hereby incorporated by reference in its entirety.

FIELD OF THE INVENTION

The present invention relates to a process for the production of micro- and nanofibres of poly(cyanoacrylate), to continuous, uniform coating layers obtained from said fibres and to substrates or articles provided with said coatings.

The production of polymer nanofibres, which are characterized by their high surface area/volume ratio and by their mechanical properties, is of considerable interest in various applications such as the production of reinforced composites, of materials used as tissue scaffolds, as filter media and for controlled drug delivery.

BACKGROUND OF THE INVENTION

The main techniques for the production of polymer nanofibres comprise processes of extrusion of a polymer melt through holes of nanometric dimensions in a template and processes of electrospinning. Electrospinning involves the use of a source of high voltage for generating electrically charged polymer jets, which are collected on a substrate as a mat of nanofibres. This technique requires the polymer to be processable in the liquid state and to be able to withstand high voltage.

In practice, however, these known techniques are not applicable for the production of nanofibres polymerized from cyanoacrylate monomers, commonly known as "Super Glue®" or "Super Attak®". The property of these monomers of polymerizing instantaneously and irreversibly in the presence of moisture in fact makes the electrospinning process rather difficult. The polymerization of the monomer triggered by the humidity of the air in fact causes obstruction of the point of the needles during processing. Moreover, the product collected on the target substrate is generally in the form of drops or beads that are not suitable for electrospinning.

Some very recent works that dealt with the problems relating to the production of poly(cyanoacrylate) nanofibres proposed, as the only existing method available for producing such nanofibres, the condensation of vapours of cyanoacrylate on specially conditioned and structured surfaces.

In contact with such surfaces, the monomers polymerize in the form of fibrillar network structures of micrometric or nanometric dimensions [1-3].

For example, fingerprints left on surfaces can act as sites of initiation for vapours of cyanoacrylate monomer and polymerization follows the thin lines of the fingerprints, forming poly(cyanoacrylate) fibres. However, the main disadvantages of these approaches concern the difficulty of scale-up and lack of process control during moisture-activated polymerization, which leads to a crosslinked polymer structure that is in the form of a hard white solid.

In this state, crosslinked cyanoacrylates cannot be dispersed in common solvents in order to be used as polymer solutions.

SUMMARY OF THE INVENTION

The general aim of the present invention is to provide a process that is simple, economical and rapid, and that can easily be implemented industrially, for producing micro- and nanofibres from cyanoacrylate monomers.

A specific aim of the invention is to provide a process that allows large quantities of micro- and nanofibres to be produced by direct electrospinning from solutions.

In view of these aims, the invention relates to methods for the production of micro- and nanofibers of poly(cyanoacrylates), as described and claimed herein.

The invention also relates to polymer coatings in the form of a uniform, continuous layer, obtained from the aforementioned micro- and nanofibers, as well as articles and/or substrates provided with said coating layers, as described and claimed herein.

BRIEF DESCRIPTION OF THE FIGURES

FIGS. 1(a), (b) and (c) are photographs obtained with the scanning electron microscope (SEM), which illustrate the electrospun nanofibers at various magnifications:

Figure 1A:
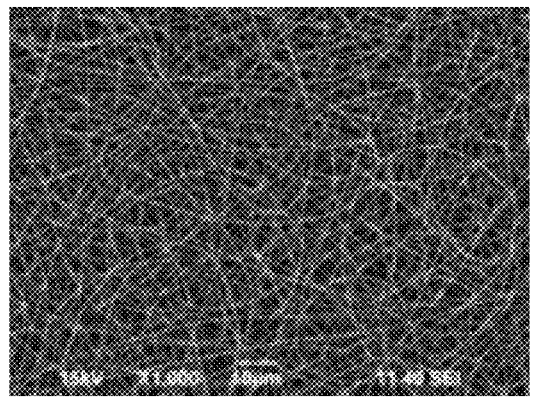
FIGS. 1(a) and (b) illustrate fibers with diameter controlled from about 300 nm to about 1.3 μm (FIG. 1(c))
Figure 1B:
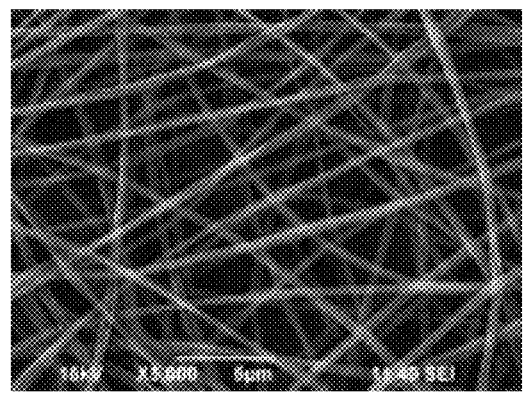
Figure 1C:
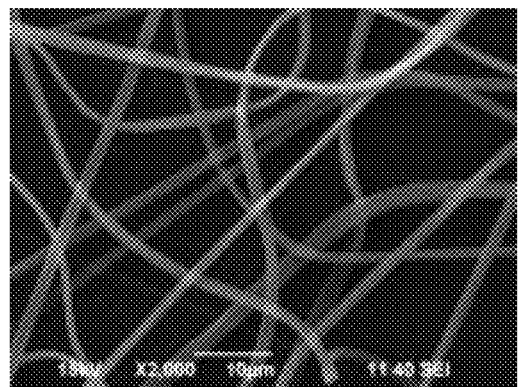

(a) magnification ×1000: nanofibers obtained from 5% w/v solution of polymer in acetone;

(b) magnification ×5000 of the fibers of FIG. 1(a);

(c) magnification ×2000: nanofibers obtained from 10% w/v solution of polymer in acetone.

DETAILED DESCRIPTION

The process according to the invention applies to any monomer of alkyl-2-cyanoacrylate (where alkyl can be $C_1$-$C_8$), among which the monomers that are the most representative and of greatest interest from the practical and industrial standpoint are methyl- or ethyl- or octyl-2-cyanoacrylate and mixtures thereof.

The first step of the process according to the invention envisages mixing the cyanoacrylate monomer in a dipolar aprotic solvent, including in particular dimethylformamide (DMF), dimethyl acetamide (DMAc), dimethyl sulphoxide (DMSO) and/or N-methyl-2-pyrrolidone (NMP); of these, DMSO is particularly preferred.

The aforementioned dipolar aprotic solvent performs the dual function of solvent for the cyanoacrylate monomer and catalyst for initiating its polymerization, leading to the formation of a viscous gel of cyanoacrylate polymer or prepolymer.

The cyanoacrylate monomer and the solvent can be mixed in any proportions by volume that lead to formation of the gel, for example with volume ratios from 0.1:1 to 2:1. When using DMSO, generally it is preferable to mix equal volumes of cyanoacrylate monomer and DMSO; mixing can be carried out by dropwise addition of cyanoacrylate monomer to the dipolar aprotic solvent, for example contained in a glass test tube.

Using a Vortex mixer, the contents can be submitted to agitation to ensure complete mixing of the two liquids. The process that leads to formation of the gel as a result of contact of the cyanoacrylate monomer with the solvent is exothermic, therefore during formation of the gel it is preferable for the test tube or the container in question to be kept in a cold environment for the purpose of accelerating the exothermic gelling process.

After gelling, preferably the gel is left to equilibrate at room temperature.

The second step of the process involves dissolution of the gel in a solvent, having properties suitable for electrospinning, which has properties of solvent for polyacrylates.

Solvents suitable for the electrospinning process comprise acetonitrile, ketones, such as in particular acetone, chlorinated hydrocarbon solvents and simple $C_1$-$C_4$ carboxylic acids such as formic acid and acetic acid. However, aqueous solvents, water, alcohols, and linear hydrocarbon solvents such as hexane and heptane, are not suitable.

In general, it is possible to use any conventional solvent that is able to dissolve a polyacrylate and has the desired electrical properties necessary for the electrospinning process. The important electrical properties of the solvent in relation to electrospinning are:

a dipole moment preferably above 3 debye;
a dielectric constant preferably above 20; and
a boiling point preferably below 110° C.

The preferred solvents are acetone and/or acetonitrile.

As stated, the gel is dissolved using an amount of solvent suitable for obtaining a solution of poly(cyanoacrylate), suitable for electrospinning; typically, the gel is dissolved in the solvent in proportions from 1% to 30% w/v.

This solution can be submitted to electrospinning using conventional electrospinning equipment.

Conventional electrospinning equipment comprises a syringe filled with the polymer solution, a syringe pump, a source of high voltage and a collector. The metal needle of the syringe typically has the function of electrode for inducing electric charges in the solution, under the influence of a strong electrostatic field.

When the charge repulsion exceeds the surface tension of the polymer solution, a charged polymer jet forms, which is accelerated towards the collector. On the way, the solvent evaporates and polymer micro- and nanofibres collect on the collector. The diameters of the fibres can vary from a few nanometers to values above 5 µm.

In contrast to the cyanoacrylate monomers, the modified poly(cyanoacrylate) is characterized by excellent electrospinning properties, as the nanofibres obtained are long and of uniform diameter, without formation of porous or bead-like structures.

The size and the morphology of the nanofibres can easily be controlled by varying the concentration of the polymer in the solvent, without using surfactants or salts, which are required for other polymeric materials. Moreover, nanofibrous mats can be deposited over a very wide area (larger than 100 $cm^2$) and collected randomly or aligned, by varying the size of the collector and thus also the applied electric field.

In particular, the main advantage of the process according to the invention is that the polymerization triggered by the dipolar aprotic solvent does not give rise to rapid polymerization with crosslinking, such as occurs with other initiators such as the amines. In these conditions, moisture does not cause rapid and irreversible polymerization, so that the cyanoacrylate polymerized (gelatinized) in this form is not thermosetting.

The process allows a layer of nanofibres with controlled thickness and density to be deposited on various substrates, such as glass, metals and plastics. It is observed that the fibres can be melted on the surfaces on which they are deposited, for example by thermal treatment in a stove, with a hot plate, with a microwave oven and/or laser, at a temperature between 100° and 300° C. with treatment times typically between 10 seconds and 5 minutes, depending on the method of melting used and the thickness of the mat of fibres. Non-porous, transparent coatings are obtained that have good scratch resistance, antifriction properties that make them useful as lubricating coatings, hydrophilic self-cleaning properties and properties of non-condensation of water vapour (antifogging properties). For example, water vapour condensed on a glass substrate coated with the fused nanofibres takes, in normal conditions of temperature and humidity, half the time to evaporate completely compared to an untreated substrate. Moreover, mechanical strength tests conducted on the coating of fused fibres demonstrate that the coatings thus obtained have a lower coefficient of friction than Teflon (typically used as lubricant). They are also characterized by excellent adhesion to the underlying substrate. In addition, the coating of fused nanofibres of polymerized cyanoacrylate has low surface roughness and good optical transparency (100% transmittance for wavelengths in the visible range). This coating, when applied to plastic substrates (for example of polydimethylsiloxane, PDMS), promotes the release of other polymeric materials (for example of the same PDMS) cured in situ on its surface (anti-sticking properties). This makes it possible to use the process according to the present invention as a substitute for other technologies, such as deposition of silanization solutions, of Parylene and of Teflon.

The invention therefore also provides a process for the deposition of coatings, as an alternative to the vapour phase deposition of polymers; in particular, the exceptional properties of the coatings thus obtained cannot be achieved if the coatings are formed by other processes, such as spin-coating and casting.

The cyanoacrylate coating developed also has good characteristics of biocompatibility, promoting cell growth more than the substrates conventionally used for these purposes (such as glass, polystyrene).

Further features of the process according to the invention are illustrated by the embodiment example that follows.

EXAMPLE

A poly(cyanoacrylate) gel was prepared using ethyl-2-cyanoacrylate and dimethyl sulphoxide mixed in 1:1 ratio by volume, following the mixing procedure described above.

Solutions of poly(cyanoacrylate) gel in acetone and acetonitrile were prepared with a concentration from 2% to 20% w/v. Each solution was collected in a 1-ml syringe fitted with a stainless steel needle with inside diameter of 0.5 mm, acting as spinneret, and connected to a generator of high voltage.

The syringe was attached to a syringe pump for maintaining a flow rate of 3-5 ml/h, depending on the viscosity of the solution. A copper plate covered with aluminium foil was used as the collector. The voltage applied and the distance from the tip to the collector were 10-15 kV and 15 cm, respectively.

The size of the fibres produced can be varied by acting upon the concentration of the polymer solution: an increased concentration of the solution greatly increases the solution viscosity, allowing fibres of larger diameter to be produced.

The electrospun nanofibres thus obtained can be thermally treated in fusion (for example at a temperature of about 130° C.) to form transparent coatings on glass substrates or on other surfaces, obtaining coatings with hydrophilic, self-cleaning properties.

The coating obtained has high adherence to the substrate, antifriction and anti-scratch properties and hydrophilic behaviour with extremely low hysteresis, as well as anti-condensation properties and biocompatibility.

The invention thus provides a process that is economical, especially when using DMSO as catalyst, which is of low cost and does not require further purification relative to the grade that is commercially available.

The fibres can be deposited on any surface, without requiring pretreatment or patterning; the polymer constituting the nanofibres and the coatings is biodegradable.

Moreover, the polymerization and electrospinning process proves to be suitable for allowing the incorporation of functional nanofillers in the fibres by direct dispersion or by means of precursors; that is, various natural or synthetic polymers can additionally be mixed in the nanofibres.

The main application is the production of filters, membranes, biomedical scaffolds, medical devices, mechanical reinforcements, coatings, as well as applications in the textile industry.

The invention claimed is:

1. A method for the production of micro- or nanofibers of poly(cyanoacrylate), comprising:

mixing a cyanoacrylate monomer with a dipolar aprotic solvent to form a poly(cyanoacrylate) gel;

dissolving the gel in a solvent for acrylates to form a solution suitable for electrospinning, and subjecting the resulting solution to electrospinning in order to form said micro- or nanofibers.

2. The method of claim 1, wherein said dipolar aprotic solvent is selected from the group consisting of: dimethyl sulphoxide, dimethylformamide, dimethyl acetamide, N-methyl-2-pyrrolidone and mixtures thereof.

3. The method of claim 1, wherein said dipolar aprotic solvent and the cyanoacrylate monomer are mixed in a volume ratio ranging from 0.1:1 to 2:1.

4. The method of claim 1, wherein said poly(cyanoacrylate) gel is dissolved in a solvent selected from the group consisting of: acetonitrile, acetone, chlorinated hydrocarbon solvents, $C_1$-$C_4$ carboxylic acids and mixtures thereof.

5. The method of claim 1, wherein said dipolar aprotic solvent is dimethyl sulphoxide and the solvent for electrospinning in which the gel is dissolved is selected from acetone and acetonitrile.

6. The method of claim 1, wherein said cyanoacrylate monomer is a $C_1$-$C_8$ alkyl-cyanoacrylate.

* * * * *